Aug. 15, 1944.　　　　　N. J. POUX　　　　　2,356,086
MACHINE FOR MAKING FASTENER STRINGERS
Filed April 17, 1941　　　7 Sheets-Sheet 1
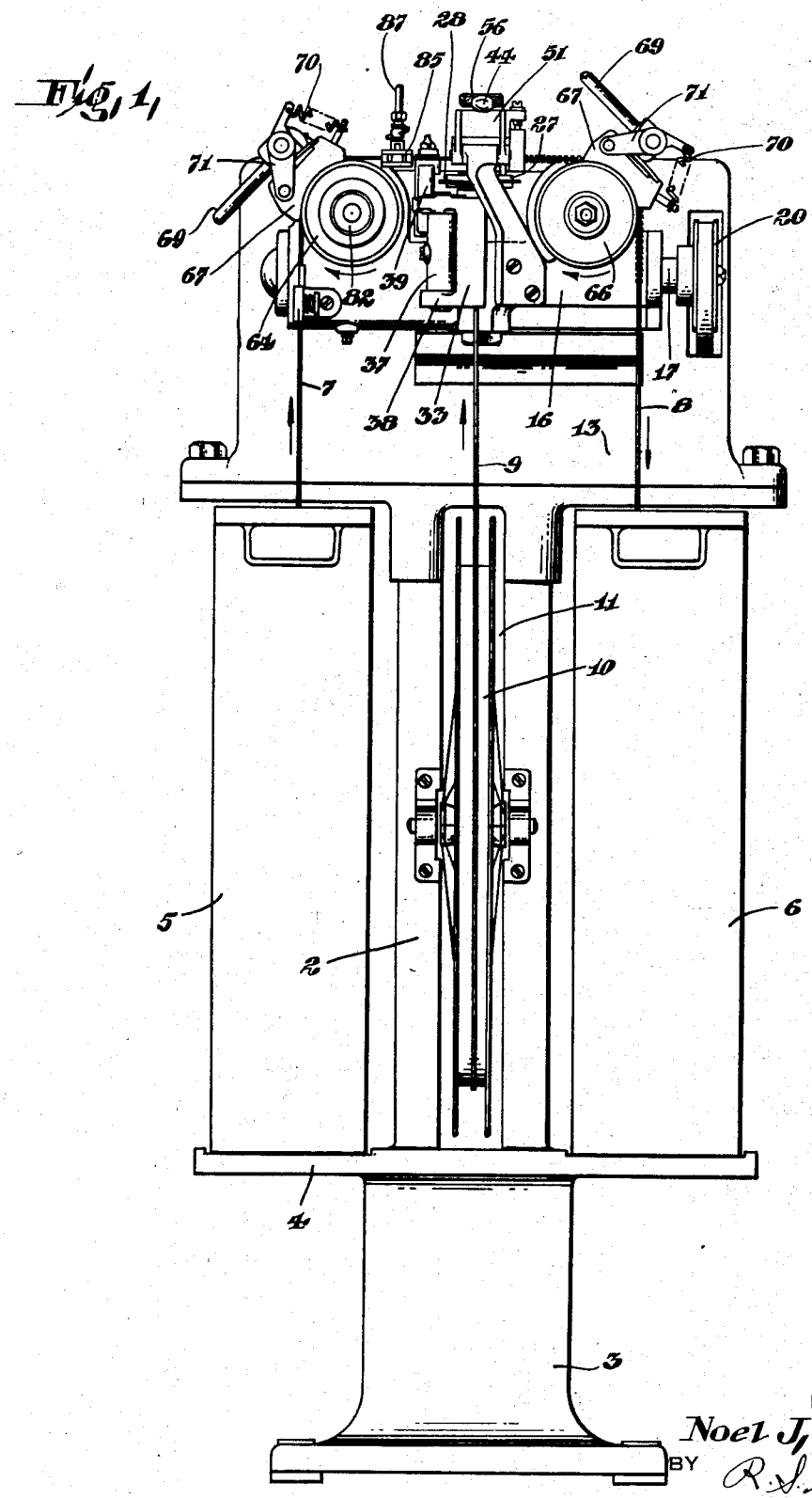

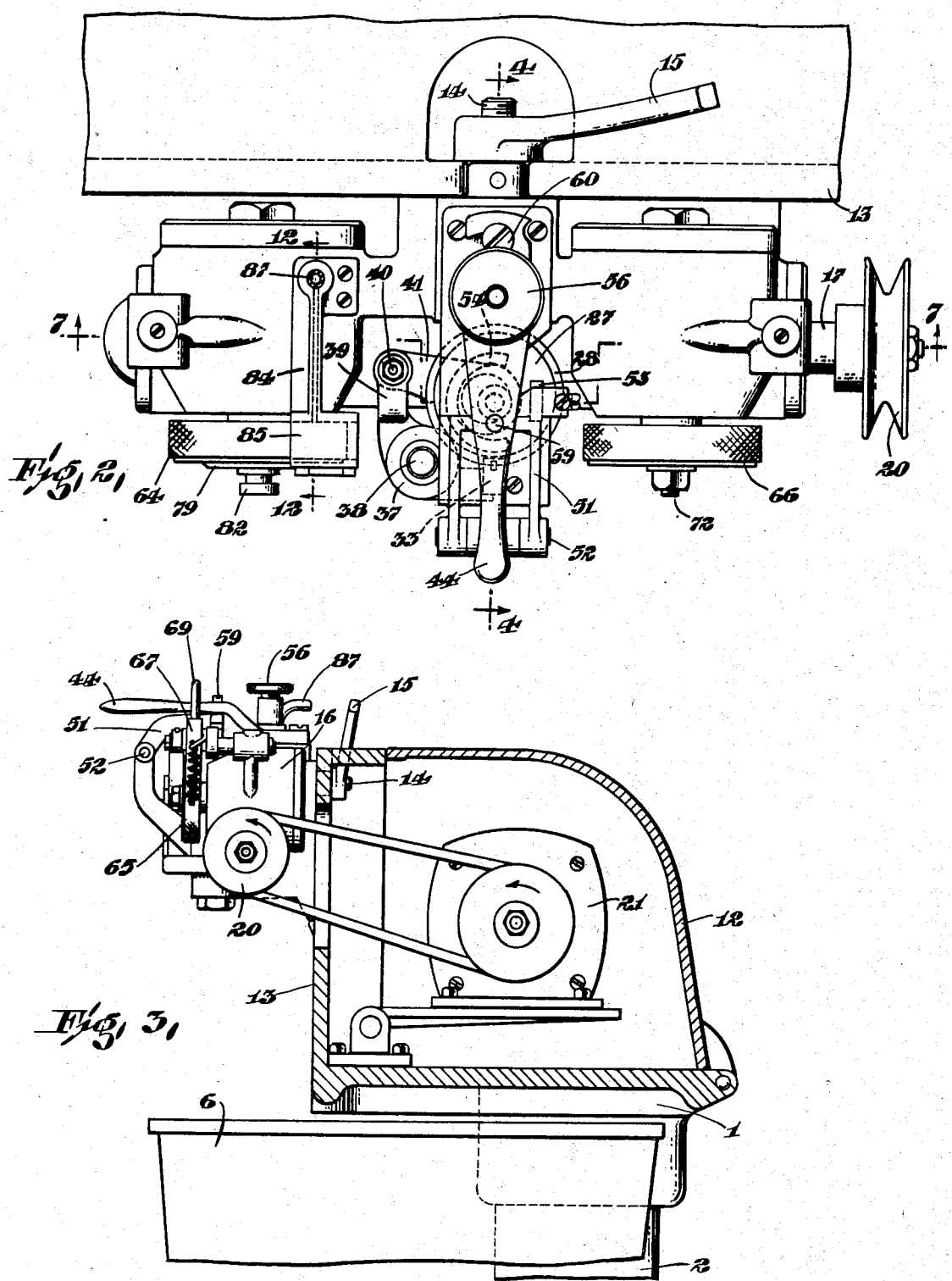

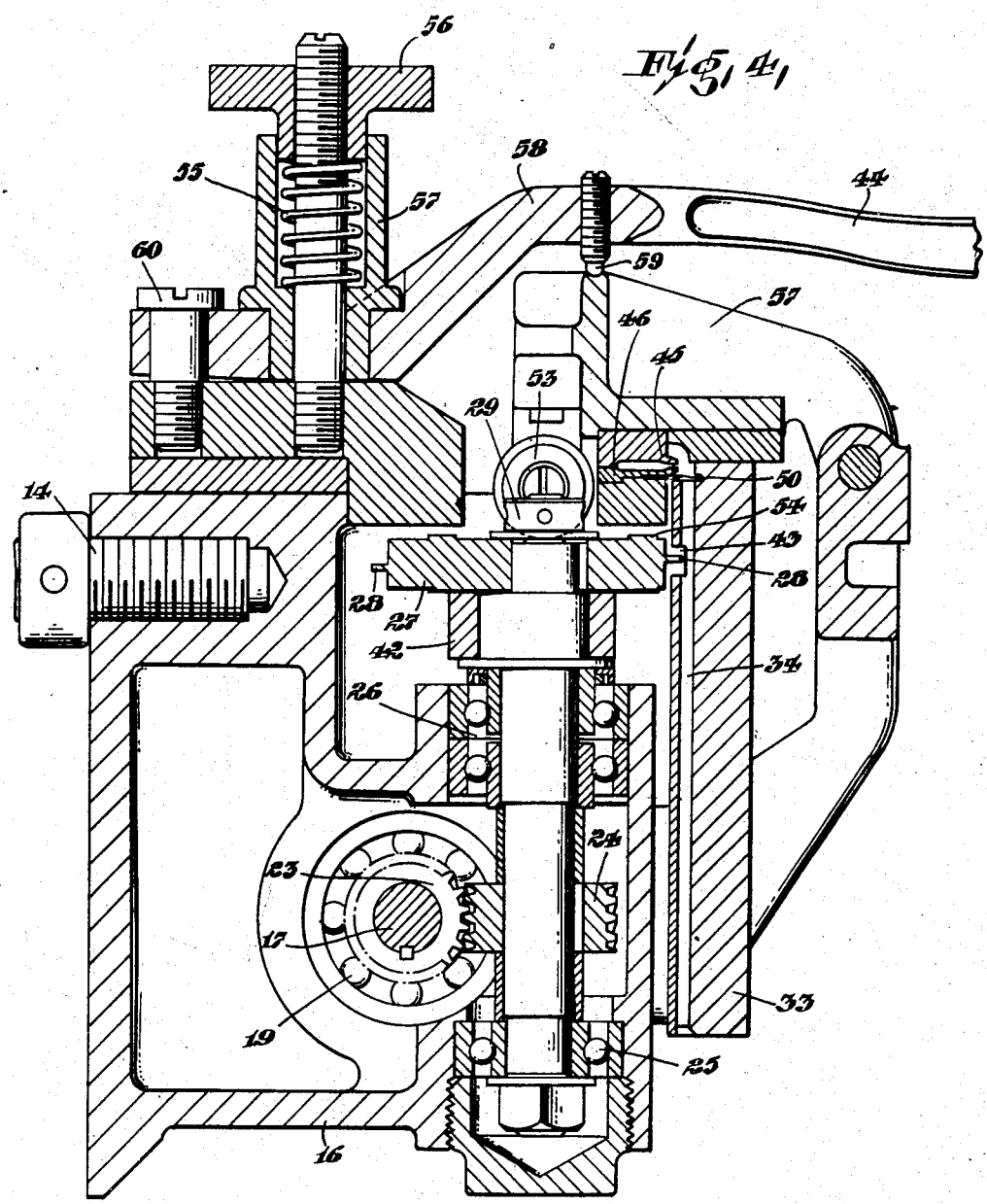

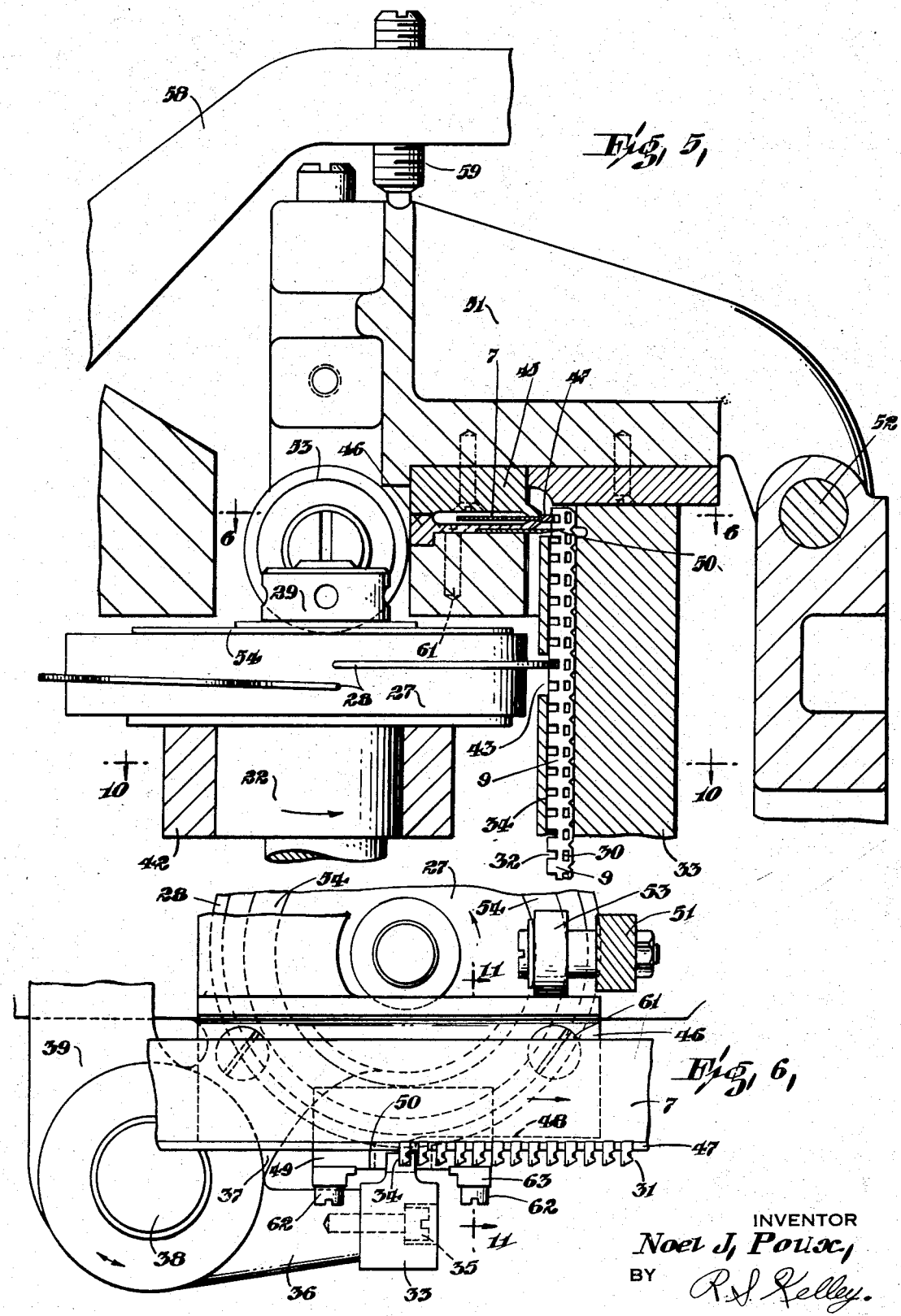

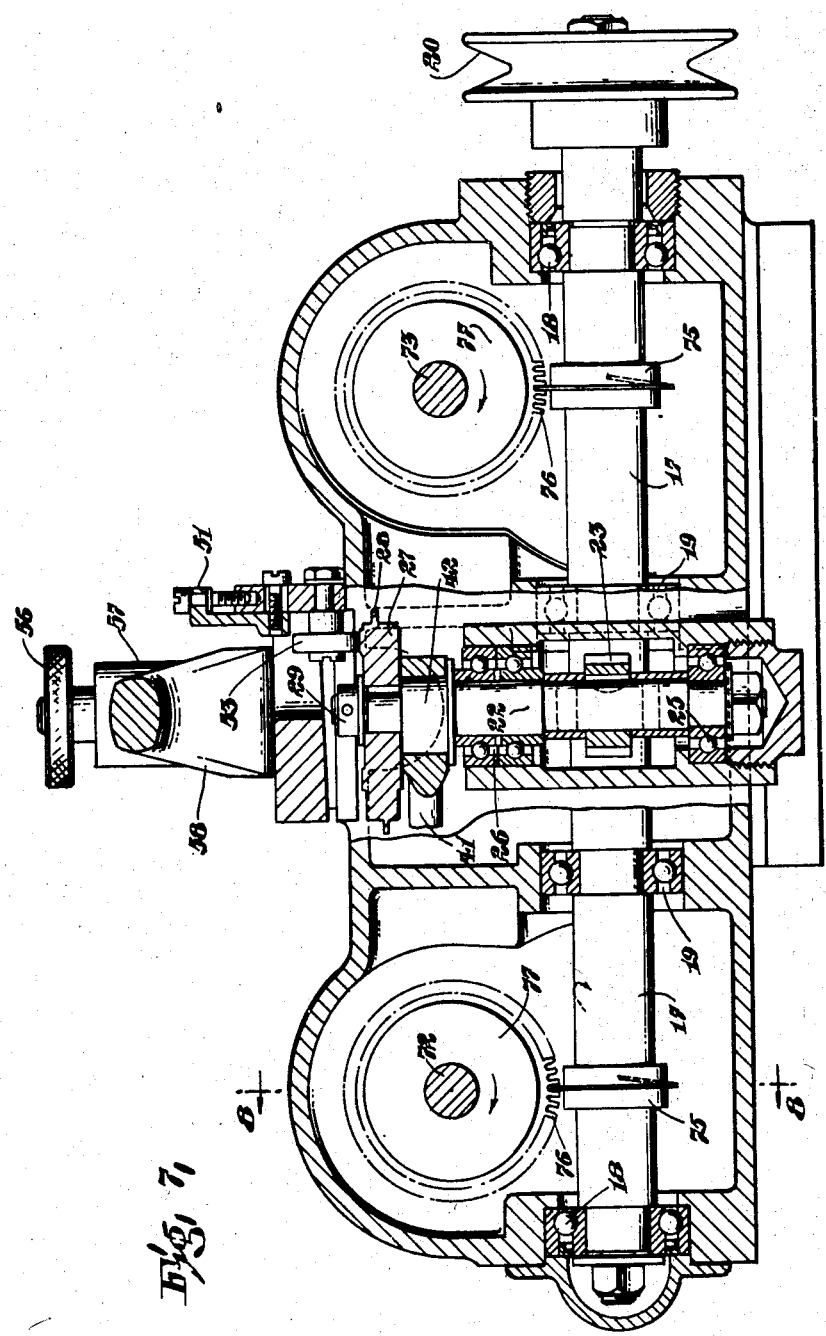

INVENTOR.
Noel J. Poux,
BY R. S. Kelley.
ATTORNEY.

Aug. 15, 1944.                N. J. POUX                 2,356,086
                MACHINE FOR MAKING FASTENER STRINGERS
              Filed April 17, 1941           7 Sheets-Sheet 7
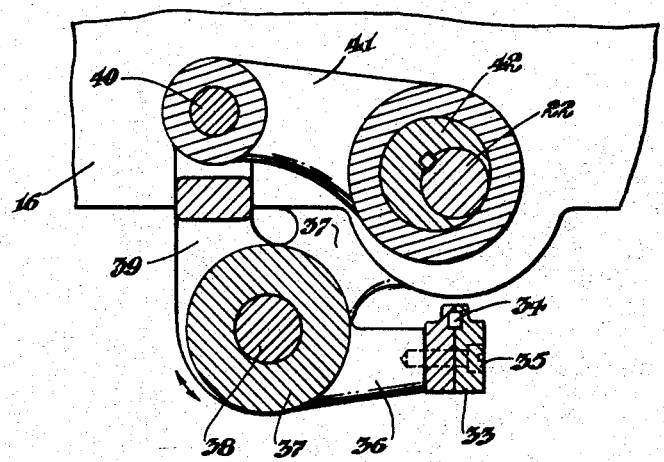
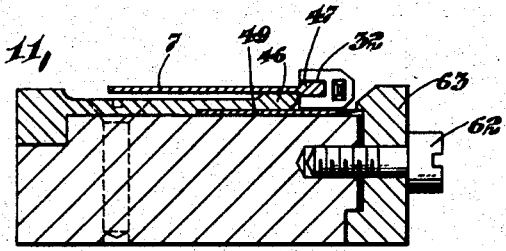
INVENTOR.
*Noel J. Poux,*
BY
*R. S. Kelley.*
ATTORNEY.

Patented Aug. 15, 1944

2,356,086

UNITED STATES PATENT OFFICE 2,356,086

MACHINE FOR MAKING FASTENER STRINGERS

Noel J. Poux, Meadville, Pa., assignor to Talon, Inc., a corporation of Pennsylvania Application April 17, 1941, Serial No. 389,012

8 Claims. (Cl. 18—1)

My invention relates to machines for making fastener stringers of the kind used for slide fasteners.

An automatic machine for making slide fastener stringers must place the fastener members on the edge of stringer, which is usually a beaded edge fabric tape, at accurately spaced intervals and the operation of such a machine must be at relatively high speeds for the sake of economy of manufacture. In the manufacture of a single slide fastener there are required two lengths of fastener stringer each of which has a large number of small accurately formed fastener members all fixed in proper position on the edge of a tape. Each of the fastener members is provided with arms which embrace the edge of the tape and with a head portion which usually consists of a tiny pocket on one side and a projection on the other side to interlock with correspondingly formed fastener members on a mating stringer.

While some fastener stringer making machines form or partly form the fastener members as well as attach them to the tape, it is deemed advisable especially where the fastener members are of plastic material, that the fastener members be substantially completely formed to shape before feeding to the automatic machine which makes the stringers. The machine as disclosed in this application is intended primarily for the manufacture of fastener stringers where the fastener members are of plastic material and accordingly the fastener members are fed to the machine after having the hand portions and the slot portions for receiving the edge of the tape, formed in a separate machine. Preferably the fastener members as they come to the machine are in the form of a long continuous strip in which the fastener members are joined integrally in side by side relation, that is, with the tape receiving slots all on one side of the strip and the head portions all on the other side of the strip. The machine must feed the strip, sever the fastener members from the tape and place them in the proper position on the edge of the tape.

In general, the object of my invention is to provide a machine of economical design which will sever the fastener members and place them on the tape accurately and uniformly at very high speeds. Other objects of the invention are to provide as simple a form of machine as possible and one which will operate continuously for long periods of time.

Another object of my invention is to maintain firm control of the fastener members until they are set in proper position on the tape.

Another object of the invention is to provide a machine with a minimum of wearing parts and wherein such wearing parts can be replaced very cheaply and quickly.

Other objects of the invention will appear from the following detailed description of one embodiment of the invention.

I have shown in the accompanying drawings one embodiment which my invention may assume in practice. In the drawings:

Fig. 1 is a side elevation view of my improved automatic machine for making fastener stringers;

Fig. 2 is a top plan view of the machine with parts removed to facilitate illustration;

Fig. 3 is an end elevation with parts in section taken from the right hand side of the machine as viewed in Fig. 1;

Fig. 4 is a vertical sectional view taken substantially on line 4—4 of Fig. 2;

Fig. 5 is an enlarged sectional view of some of the parts shown in Fig. 4, illustrating the fastener member strip and tape in position in the machine;

Fig. 6 is a horizontal section on line 6—6 of Fig. 5;

Fig. 7 is a vertical sectional view at right angles to the sectional view of Figs. 4 and 5 taken on line 7—7 of Fig. 2;

Fig. 10 is a detailed horizontal sectional view on line 10—10 of Fig. 5;

Fig. 11 is a detail section on line 11—11 of Fig. 6; and

Fig. 12 is a detail section on line 12—12 of Fig. 2.

Figure 8:
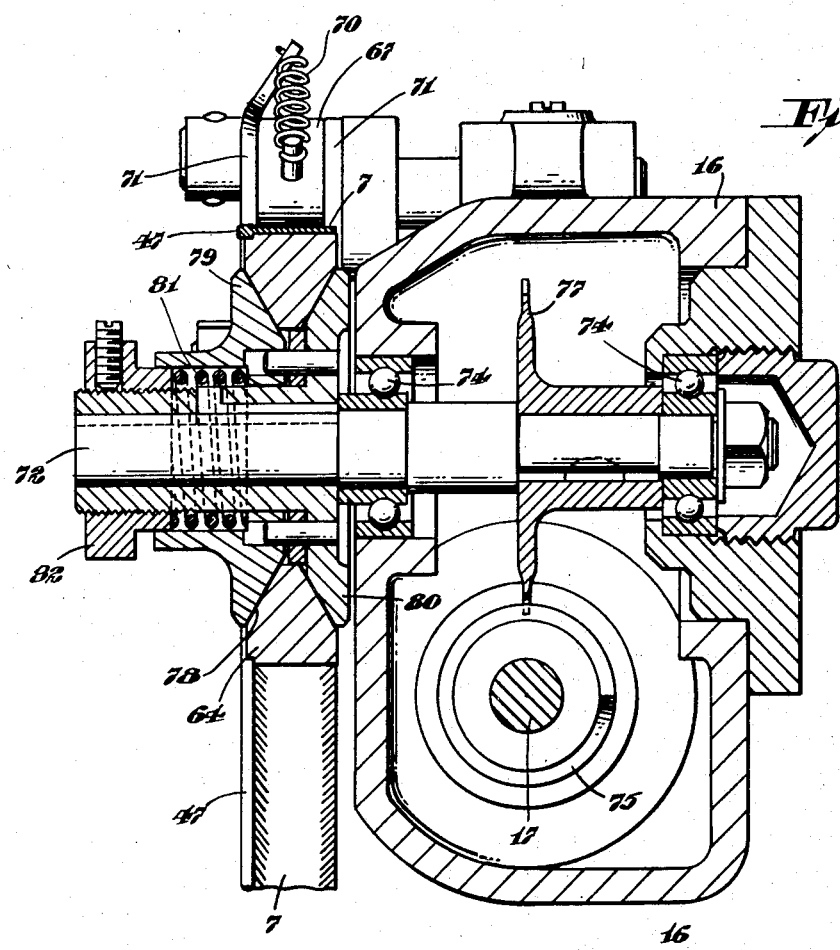
Fig. 8 is a vertical sectional view taken on line 8—8 of Fig. 7.

The machine is mounted on a table top 1 supported on a pedestal 2 having a pedestal base 3 which rests on the floor. The pedestal has shelves 4 upon which suitable containers 5 and 6 may be placed. The tape 7 is fed to the machine from the container 5 and the fastener stringer comes out of the machine into the container 6. The fastener member strip 9 is fed upwardly to the machine from a roll 10 mounted in a slotted central portion 11 of the pedestal 2.

The table top 1 has mounted thereon a motor housing 12 with a vertical face 13 and the fastener stringer making machine is supported upon this vertical face by suitable bolts 14 and nuts 15. Due to this arrangement the operating units of the machine can be easily removed and while in use access and visibility are afforded to all sides of the machine.

The operating parts of the machine are contained within or mounted upon cast housing or frame 16 which, of course, is provided with suitably arranged openings for the shafts and other parts. The main drive shaft 17 extends horizontally through this housing and is mounted on roller bearings 18 at opposite ends and in bearings 19 in the interior of the housing. Power is supplied to the machine through a pulley 20 on the end of the main shaft which is belt-connected to the motor 21 in the motor housing above referred to.

A central vertical shaft 22 (see Figs. 4 and 7) is driven from the horizontal main shaft by helical gearing 23, 24. This shaft is supported in a lower roller bearing 25 and a larger upper bearing 26. The shaft 22 projects a considerable distance above the bearing 26 and has mounted on its end a disk 27 upon which is formed the cam 28 for feeding the fastener member strip. The disk 27 is keyed to the shaft 22 in an eccentric position for a purpose which will later appear. The disk 27 is held in position upon the shaft by a suitable nut 29.

The strip 9 of fastener members is of a form which has been in commercial use for the manufacture of plastic slide fasteners in which the fastener members are integrally joined in side by side relation. Each fastener member has a head end with a recess 30 on one side and a projection 31 on the other side and a tape receiving end provided with a slot 32. This strip is fed upwardly through a strip guide 33 having a rectangular-shaped guideway 34 slightly larger than the cross-section of the fastener member strip. The guide 33 is made in two pieces as seen in Fig. 10 and held together by suitable screws 35 which screws also connect it to the bell crank lever 36. This lever where it attaches to the guideway has a considerably vertical extent and is bifurcated to straddle a stationary boss 37 and the bifurcated ends are journalled upon the ends of shaft 38 which extends through the boss 37. An arm 39 integral with the lever extends at substantially right angles thereto and is pivotally connected at 40 to a floating link 41, the other end of which link connects to the central vertical shaft 22 through an eccentric 42. In this manner as the shaft 22 is rotated the strip guideway is moved inwardly and outwardly or back and forth to the left and right as viewed in Figs. 4 and 5. The flange cam 38 is in constant engagement with at least one of the slots 32 in the fastener member strip and in view of the fact that the fastener member strip is moved back and forth upon each rotation of the shaft 22, this flange cam is eccentrically mounted as above mentioned in order that the same may be moved back and forth relative to the shaft in timed relation with the movement of the strip guideway. This flange cam projects through an opening 43 in the wall of the strip guide. The design of this cam is such that it will rapidly feed the strip upwardly during the interval when the strip is retracted or moved to the right, as shown in Fig. 5.

The tape 7 to which the fastener members are to be attached is moved step by step horizontally and transversely to the direction of the fastener member strip. At the place where the fastener members are to be attached the tape is held in proper position between upper and lower clamping members 45 and 46, respectively, and the jaws of these clamping members bear firmly against the beaded edge 47 of the tape. When the strip is moved inwardly or to the left, as shown in Fig. 5, a fastener member is forced over the beaded edge 47 of the tape. The fit of this beaded edge in the slot 32 of the fastener member is sufficiently close that the fastener members will be retained in place by friction until they are fed out of the machine. As seen in Fig. 6, the clamping members 45 and 46 are recessed at 48 to provide clearance for free movement of the fastener members. As the strip is moved inwardly to place a fastener member on the tape, such fastener member is simultaneously severed from the end of the strip. This is accomplished by mounting a stationary knife herein shown, substantially in the form of a razor blade 49 just under the lower tape clamping member 46. The cutting edge 50 of the knife projects outwardly beyond the beaded edge of the tape so that the fastener member will be completely severed when it is pushed into proper position on the edge of the tape.

In order to allow for the step-wise movement of the tape the upper clamping member must be lifted slightly to release the tape during feeding. This clamping member is attached to a lever 51 which is mounted on a pivot 52 to the frame. This lever carries a roller cam follower 53 which is in engagement with a surface cam 54 on the upper surface of the cam member 27 mounted on vertical shaft 22. Accordingly, during each rotation of shaft 22, the follower 53 and accordingly the lever 51 will be lifted slightly and the cam is so designed that the tape will be released at the proper time for feeding.

This cam is spring-pressed downwardly by means of a spring 55 the tension of which may be adjusted by a nut 56, such spring acting through the sleeve 57 upon a bracket 58 which exerts pressure upon the lever 51 through a screw 59. The bracket 58 is journalled upon the lower end of the sleeve 57 and carries a handle 44. When this handle is shifted side-wise the screw 59 moves away from the lever 51 and when again swung back to position, is stopped in the proper place by a screw 60. In this manner, the lever 51 may be quickly released and swung upon its pivot 52 so as to clear the space above the tape and knife 49. This permits easy and quick adjustment or replacement of the knife 49 because after the lever 51 is swung away it is only necessary to remove or release the screws 61, the screws 62 and the knifeholder 63.

Figure 9:
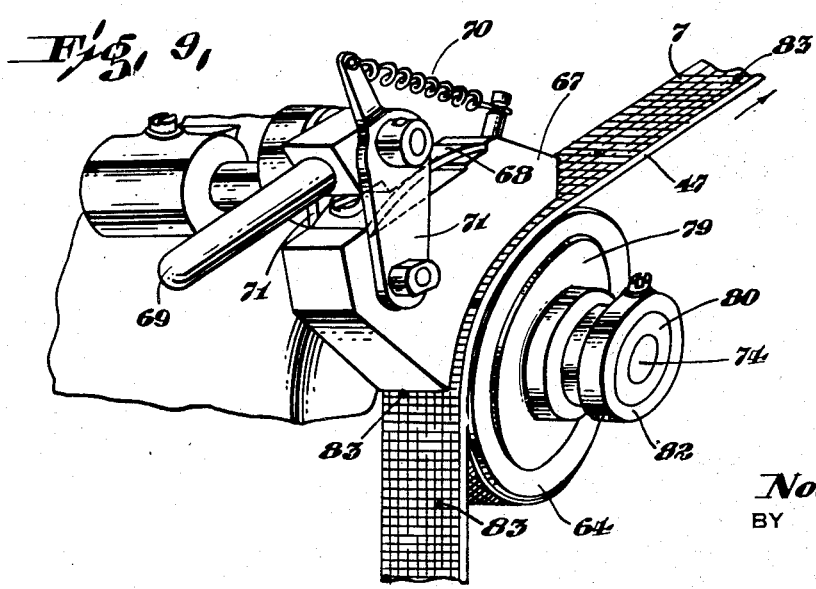
Fig. 9 is a perspective view of one of the tape feeding drums.

The mechanism for step-wise feeding of the tape in proper timed relation to the movement back and forth of the strip guideway, will now be described. As shown in Fig. 1, the tape 7 feeds over a lead-in drum 64 through the assembly mechanism here generally designated 65, and over the take-off drum 66. Normally the advancement of the tape is accomplished solely by the take-off drum 66 and the drum 64 is held under friction to maintain the portion of tape between the drums under uniform tension. This is necessary to provide for uniform stretching of the tape and therefore uniform spacing of the fastener members on the tape. The tape is maintained in contact with a knurled surface of each of the drums by a friction shoe 67, shown in Fig. 9. This friction shoe is acted upon normally by a leaf spring 68 but when this leaf spring is released by upward movement of a handle 69 the coil spring 70 acting through lever 71, will lift the friction shoe 67 sufficiently to release the tape so that it can be threaded into or taken out of the machine. This particular part of the mechanism is commonly known to those skilled in fastener making machines and need not be described in more detail.

Means is provided for a step-wise power feeding of both of these drums. The lead-in drum 64 is mounted on a shaft 72 and the take-off drum is mounted on shaft 73. These shafts extend horizontally through the machine housing 16 from front to rear and are journalled in suitable bearings 74 shown in Fig. 8. A step-wise rotation is imparted to each of the drums by means of a helical cam 75 mounted on the main horizontal drive-shaft 17. This helical cam meshes with teeth 76 of a gear wheel 77 mounted on each of the shafts 72 and 73. The take-off drum is a plain solid knurled drum mounted on the overhanging end of its shaft 73. However, the lead-in drum 64 is connected to its shaft 72 through a friction mechanism, shown in Fig. 8. The drum is provided with inclined friction faces 78 which are engaged between cooperating friction faces on the sleeves 79 and 80. The sleeve 79 is spring-pressed inwardly by coil spring 81, the tension of which is adjustable by means of a nut 82 so that the friction between the inclined surfaces of the sleeves and of the drum can be adjusted.

Either the diameter of drum 64 is made slightly smaller than the diameter of drum 66 or the arc of rotation at each feeding step is made slightly less. In this manner there will be a constant tension on the portion of tape between the drums. However, such tension cannot build up to an undesired amount because the adjustable friction clutch on drum 64 allows for slippage if the tension of the tape should become too great. Some difficulty has been experienced in feeding tapes through conventional tension devices due to the fact that slight imperfections, knotty cords, and the like may appear on the tape. They will not tend to slip between the friction surfaces as easily and the tension of the tape will become greater before they will go through the tension device. In my improved tape feed mechanism, however, it will be seen that the lead-in drum is power-driven and if a knot or imperfection should appear, as indicated at 83, in the tape, it will not stick against the friction block but because the lead-in drum is power-driven, it will forcibly move such knot under the friction shoe. Thus, a substantially uniform tension is maintained which is highly desirable in this type of machine.

If desired, and assuming the plastic fastener members are made of a material which is soluble, a solvent applying device 84 may be attached to the machine between the feed drums and in advance of the applying mechanism. It consists of a bracket provided with a holder 85 for absorbent material 86 which surrounds the tape or at least that portion of it which it is desired to soak with solvent. The solvent may be supplied through a tube 87. Thus, as soon as the fastener members are applied to this tape, they will be acted upon by the solvent to form a cement which will stick them more firmly to the tape.

While I have shown and described in this application one embodiment which my invention may assume in practice, it will be understood that the embodiment shown is merely for the purpose of illustration and that various other forms may be devised within the scope of my invention as set forth in the appended claims.

What I claim as my invention is:

1. In a machine for making fastener stringers, a guide for a group of fastener members arranged in side by side relation, means for feeding a tape in a direction transversely of said group, and means for moving said fastener member guide back and forth to place a fastener member on the edge of said tape upon each back and forth movement of the guide.

2. In a machine for making fastener stringers, a guide for a group of fastener members arranged in side by side relation, means for feeding a tape transversely of said group and adjacent the end member of said group, means for moving said fastener member guide back and forth to place the end fastener member of the group on the edge of said tape, and means for advancing the group along said guide between the back and forth movement of the group to locate the fastener members in position successively to be moved into engagement with said tape.

3. In a machine for making fastener stringers, a guide for a group of fastener members arranged in side by side relation, means for feeding a tape transversely of said group and adjacent the end member of said group, means for moving said fastener member guide back and forth to place the end fastener member of the group on the edge of said tape, and means for advancing the group along said guide between the back and forth movements of the group to locate the fastener members in position successively to be moved into engagement with said tape, comprising means in constant engagement with a member of the group during its back and forth movement.

4. In a machine for making fastener stringers, a guide for a fastener member strip in which the fastener members are integrally joined to one another, means for feeding a tape in a direction transversely of the fastener member strip and in alignment with the end fastener member of the strip, means for moving said guide back and forth to place such end member in engagement with the tape, means for simultaneously severing said end member from the strip upon movement of such end member into engagement with the tape, and means for intermittently advancing the strip to move the fastener members successively into alignment with said tape.

5. In a machine for making fastener stringers, a guide for a fastener member strip in which the fastener members are arranged in side by side relation and integrally joined to one another, means for feeding a tape in a direction transversely of the fastener member strip and in alignment with the end fastener member of the strip, means for moving said guide back and forth to place such end member in engagement with the tape, a knife mounted closely adjacent said tape and with its cutting edge projecting beyond the edge of the tape in position to sever the end member from the strip upon movement of such end member into engagement with the tape, and means for intermittently advancing the strip to move the fastener members successively into alignment with said tape.

6. In a machine for making fastener stringers, the combination defined in claim 5 wherein the means for intermittently advancing the fastener member strip consists of a rotating cam in constant engagement with a portion of the strip even during the back and forth movement of the strip.

7. In a machine for making fastener stringers from a continuous strip of integrally joined fastener members, each fastener member having a head portion at one end and a slotted portion at the other end, the slotted portions all being aligned on one side of the strip, the combination consisting of a guide for such a fastener member strip, means for feeding a tape in a direction transversely of the fastener member strip, and in alignment with the end fastener member of the strip, means for moving said guide back and forth to place such end member in engagement with the tape and a knife mounted closely adjacent said tape with its guiding edge projecting beyond the edge of the tape in position to sever the end member from the strip upon movement of such end member into engagement with the tape, and means for intermittently advancing the tape in the guideway to move the fastener members successively into alignment with said tape, which consists of a rotating shaft, a thread-like helical cam mounted on said shaft in an eccentric position, said thread-like cam being in constant engagement with at least one of the slots in the fastener member strip, the eccentric mounting of said cam on said shaft being such as to synchronize the movement thereof in timed relation with the back and forth movement of said fastener strip guide.

8. In a machine for making fastener stringers, a guide for a fastener member strip in which the fastener members are integrally joined to one another, means for intermittently feeding a tape adjacent the end of said fastener member strip, tape holding and guide means adjacent the end of said fastener member strip consisting of two members engageable with opposite sides of the tape, means for moving said fastener member strip guide to place the end member of the strip in engagement with the tape, means for simultaneously severing said end member from the strip upon movement thereof into engagement with the tape, means for holding said members in gripping relation relative to the tape to hold the tape firmly during movement of such end member into engagement with the tape, and means for moving said holding members apart to release the grip on the tape and permit advancement thereof to a position for receiving the next fastener member.

NOEL J. POUX.